United States Patent
Andersen

(10) Patent No.: US 8,671,696 B2
(45) Date of Patent: Mar. 18, 2014

(54) METHOD AND APPARATUS FOR INCREASING THRUST OR OTHER USEFUL ENERGY OUTPUT OF A DEVICE WITH A ROTATING ELEMENT

(76) Inventor: Leonard M. Andersen, New York, NY (US)

(*) Notice: Subject to any disclaimer, the term of this patent is extended or adjusted under 35 U.S.C. 154(b) by 1037 days.

(21) Appl. No.: 12/724,863

(22) Filed: Mar. 16, 2010

(65) Prior Publication Data
US 2011/0005196 A1    Jan. 13, 2011

Related U.S. Application Data

(60) Provisional application No. 61/213,751, filed on Jul. 10, 2009.

(51) Int. Cl.
*F02C 7/12* (2006.01)
(52) U.S. Cl.
USPC ............... 60/806; 60/735; 415/115; 416/96 R
(58) Field of Classification Search
USPC ................. 416/96 R, 97 R, 95; 415/115, 180; 60/806, 735
See application file for complete search history.

(56) References Cited

U.S. PATENT DOCUMENTS

| | | | | |
|---|---|---|---|---|
| 2,778,601 A * | 1/1957 | Eckert | ............. | 416/96 R |
| 2,883,151 A * | 4/1959 | Dolida | ............. | 416/96 R |
| 3,739,581 A | 6/1973 | Talmor | | |
| 4,118,145 A * | 10/1978 | Stahl | ............. | 416/96 R |
| 4,260,336 A * | 4/1981 | Johnson | ............. | 416/96 R |
| 4,330,235 A * | 5/1982 | Araki | ............. | 416/96 R |
| 4,338,780 A * | 7/1982 | Sakamoto et al. | ............. | 60/775 |
| 5,122,033 A * | 6/1992 | Paul | ............. | 416/96 R |
| 5,125,793 A * | 6/1992 | MacArthur et al. | ............. | 415/114 |
| 5,538,394 A * | 7/1996 | Inomata et al. | ............. | 416/97 R |
| 5,624,231 A * | 4/1997 | Ohtomo et al. | ............. | 416/97 R |
| 6,241,469 B1 * | 6/2001 | Beeck et al. | ............. | 415/115 |

(Continued)

FOREIGN PATENT DOCUMENTS

JP    62294703 A    * 12/1987
JP    02108822 A    * 4/1990

OTHER PUBLICATIONS

Aircraft Propulsion, Saeed Farokhi, © 2009 pp. 7, 147,148,149, 535,536,537,541,542,557,561,565,566,567,569,570,571,572,575, 582,627.

*Primary Examiner* — William H Rodriguez
(74) *Attorney, Agent, or Firm* — Leason Ellis LLP

(57) ABSTRACT

A turbine arrangement is provided for use in a gas turbine engine that includes a combustion chamber and a nozzle. The turbine arrangement includes a source of liquid and a turbine blade assembly that is rotatable about a central shaft. The blade assembly further includes a plurality of turbine blades, the blade having a forward edge that faces the combustion chamber and an opposite rear edge. A hollow interior of at least one blade is in fluid communication with the source of liquid. The blade (e.g. a rear edge thereof) including a plurality of openings in communication with the hollow interior and sized to produce liquid droplets for discharge downstream of the turbine blade to generate a gas (e.g., steam) due to contact with hot gases generated by the combustion chamber. The rotation of the turbine blades and discharge of the liquid in droplet form causes the liquid droplets to travel in a non-linear pattern resulting in conversion of the liquid droplets to the gas and an increase in volume for the hot gases, thereby resulting in the hot gases leaving the nozzle with increased thrust.

28 Claims, 8 Drawing Sheets

(56) References Cited

U.S. PATENT DOCUMENTS

| | | |
|---|---|---|
| 6,835,046 B2 * | 12/2004 | Strassberger et al. ....... 416/97 R |
| 7,033,135 B2 * | 4/2006 | Mortzheim et al. .......... 415/115 |
| 7,388,209 B1 | 6/2008 | Gormley et al. |
| 7,506,513 B2 | 3/2009 | Roche et al. |
| 7,513,100 B2 | 4/2009 | Motter et al. |
| 7,520,137 B2 | 4/2009 | Hoffmann et al. |
| 7,981,059 B2 | 7/2011 | Ueda et al. |
| 8,057,163 B2 * | 11/2011 | Thompson et al. ........... 415/115 |
| 8,092,175 B2 * | 1/2012 | Beeck et al. .................... 416/95 |
| 2011/0083444 A1 * | 4/2011 | Bathina et al. ................. 60/776 |

* cited by examiner

METHOD AND APPARATUS FOR INCREASING THRUST OR OTHER USEFUL ENERGY OUTPUT OF A DEVICE WITH A ROTATING ELEMENT

CROSS-REFERENCE TO RELATED APPLICATION

The present application claims the benefit of U.S. patent application Ser. No. 61/213,751, filed Jul. 10, 2009, which is hereby incorporated by reference in its entirety.

TECHNICAL FIELD

The present invention relates to a turbine engine or other device with a rotating element and, in particular, to a method and apparatus for delivering a fluid (liquid) through a rotating piece(s) or element(s) that is connected to a main shaft associated with the turbine and/or is located beyond a hot end of the main shaft. When located beyond the hot end of the main shaft, the rotating piece(s) or element(s) can be rotated by mechanical power (a driven rotating shaft) or by hot combustion gas acting on the blade(s) (e.g., a wind milling effect). In accordance with the present invention, an increase in thrust output is realized due to liquid water or other liquid vaporizing quickly in small volume with resulting increased thrust gas volume yielding benefit.

BACKGROUND

In the jet engine and the turbine engine technical fields, there has been a constant endeavor to increase energy output per unit of fuel. Generally, in a gas turbine installation, a part of compressed air generated from a compressor is used for turbine cooling. Thus, an improvement in power efficiency and an increase in an output of a gas turbine system can be achieved by increasing the cooling capability of cooling air and reducing the amount of compressed air required for cooling. To that end, a technique for reducing the flow rate of compressed air required for cooling blades is practiced. A turbine blade cooling circuit is often used. However, the high pressure from the compressor makes it difficult for the turbine blade cooling circuit to operate in an ideal manner.

A gas turbine or jet engine typically includes a compressor assembly for compressing a working fluid, such as air. The compressed air is flowed into a combustor which heats the fluid causing it to expand. The expanded fluid is then forced through the turbine.

The output of known gas turbine engines is limited by an operating temperature of the working fluid at the output of the compressor assembly. At least some known turbine engines include compressor cooling devices, such as intercoolers, to extract heat from the compressed air to reduce the operating temperature of the flow exiting the compressor. As a result of the decreased temperatures, increased power output can be achieved by increasing flow through the compressor assembly.

To facilitate additional cooling, at least some gas turbine engines include water injection systems that overcome some of the shortcomings associated with intercoolers. Such systems use a plurality of nozzles to inject water into the flow during engine operation.

The essential goal in designing the jet engine has always been to produce more thrust and fuel efficiency to achieve turbine durability (that is, an improved component life). To do so, the combustor needs to operate at a higher temperature, which requires cooling the turbine. The first mass produced axial engine, Jumo 004B, utilized internal cooling for the turbine blades. So, the concept is as old as the turbojet engine itself. Fuel efficiency can further be enhanced by cooling the turbine blades with airflow or liquid-flow into gas (steam) through them. Afterburners provide a a means for an emergency boost; however, they suffer from fuel inefficiency relative to the other working components of the turbine.

FIG. 1 illustrates a conventional driven apparatus 100 that contains an engine and in particular, the apparatus 100 is in the form of an aircraft that includes a turbine engine 200. However, the present invention is not limited to being used in an aircraft and it will be appreciated that it equally can be used in other gas turbine settings including a vehicle, ship, electrical power generation, etc. As shown in FIG. 2, the turbine engine 200 includes a number of components some of which can be broadly categorized and identified as a compressor 300, a combustion chamber 400, a fuel burner 500, a turbine 600, and a nozzle 700. FIG. 2 illustrates one exemplary form of a turbine engine in the form of a jet engine, a turbojet, a gas turbine, a ramjet, or a scramjet engines; however, it will be appreciated that the turbine engine 200 can be of another engine type.

FIG. 2 illustrates an overview of the jet engine 200, wherein air 210 is drawn into the turbojet by the high by-pass fan 250 and the compressor 300. The compressor 300 is basically a large spinning fan. The compressor slows down the incoming air, raising its pressure, and delivers it to the combustion chamber 400. Fuel is injected into the high-pressure air in the combustion chamber and ignited by the fuel burner 500. The resulting hot gases 410 expand and rush first through the turbine 600 and then through the nozzle or exhaust section 700 located at the rear. A rotating shaft 800 may connect all the above components to provide momentum when rotating. A forward thrust is generated as a reaction to the rearward momentum of the exhaust gases.

The turbine 600 includes a series of bladed discs that act similar to a windmill, gaining energy from the hot gases 410 leaving the combustor. Some of this energy is used to drive the compressor, and in some turbine engines (i.e., turboprop, turboshaft or turbofan engines), energy is extracted by additional turbine discs and used to drive devices such as propellers, bypass fans, helicopter rotors or electrical generators. These series of bladed discs are known as turbine blades.

FIG. 3 illustrates various components of the turbine engine 200 showing detailed view of the turbine 600, including various blades 602 and 602a. The hot exhaust 410 acts on the turbine blades 602, while leaving the combustion chamber 400 causing the turbine blades to spin around. A forward thrust is generated as a reaction to the rearward momentum of the exhaust gases when the hot gasses 410 rush toward the blades leaving the nozzle (exhaust section) 700. The turbine 600 is designed to provide mechanical energy and rotation to the compressor.

The purpose of the turbine is to provide momentum to the compressor 300 that is attached by the rotating shaft 800, thereby enabling the compressor 300 to continually draw in more air. Thus, the air that is compressed in the compressor 300 and then heated in the combustion chamber 400 is not only used to provide a forward thrust but also to drive the turbine 600 that drives the compressor 300 that compresses the air.

The difficulty with making the exhaust gases drive a turbine 600 is that the forward thrust depends upon the difference in pressure between the closed and open ends of the combustion chamber 400, and if the escaping gases have to push against an object (e.g., the turbine blades) that difference in pressure is lessened. In other words, a pressure at the rear of the system detracts from the forward thrust. Thus, the designer's aim in a turbojet engine is to reduce to a minimum the power taken by the turbine 600 to compress the air so that the maximum amount of forward thrust is available.

Since the turbine blades 602a come into contact with the hot combustion gases, the blades 602a (especially the edges) get very hot, which adversely impacts the efficiency of the engine. It has been proposed to cool the blades by flowing air relative to the blades in order to cool the surface of the blades and thus increase blade efficiency. While decreasing the temperature of the blades can yield some improvement in efficiency, this arrangement can be improved upon in order to yield a more efficient arrangement.

There is thus a need for an improved, alternative design involving cooling ejection by dispersing liquid throughout the turbine area or on the turbine blades or the rotating shaft of the turbine. Further, there is a need to produce a unique jet engine turbine blade design where water or other liquid is introduced into the blade and then discharged from the blade as liquid droplets (e.g., 10 micron size) that contact hot combustion gases, thereby generating a gas (e.g., steam) and yielding combustion gas volume increase converting heat energy to thrust energy and/or mechanical energy. This energy can then be extracted by an aeroderived gas turbine power turbine unit. In at least some embodiments, the claimed arrangement is done to increase the thrust output of the turbine by heat energy that generates the gas and thereby increase the efficiency of the jet engines.

SUMMARY

According to one embodiment, a turbine arrangement is provided for use in a gas turbine engine that includes a combustion chamber and a nozzle (exhaust section). The turbine arrangement includes a source of liquid and a turbine blade assembly that is rotatable about a central shaft. The blade assembly further includes a plurality of turbine blades, the blade having a forward edge that faces the combustion chamber and an opposite rear edge. A hollow interior of at least one blade is in fluid communication with the source of liquid. The rear edge of the blade includes a plurality of openings in communication with the hollow interior and sized to produce liquid droplets for discharge downstream of the turbine blade to generate a gas (steam) due to contact with hot gases generated by the combustion chamber. The rotation of the turbine blades and discharge of the liquid in droplet form causes the liquid droplets to travel in a non-linear pattern resulting in conversion of the liquid droplets to the gas (steam) and an increase in volume for the hot gases, thereby resulting in the hot gases leaving the nozzle with increased thrust.

DETAILED DESCRIPTION OF CERTAIN EMBODIMENTS OF THE INVENTION

In accordance with one embodiment of the present invention, to substantially increase the thrust of an engine that contains a turbine, the present invention provides a fluid flow path and an arrangement of holes (fluid flowing apertures) in the turbine blades or rotating element such that the fluid (liquid) flows inside the turbine blades and turbine shaft as illustrated in the embodiments of FIGS. 3-9.

Figure 1:
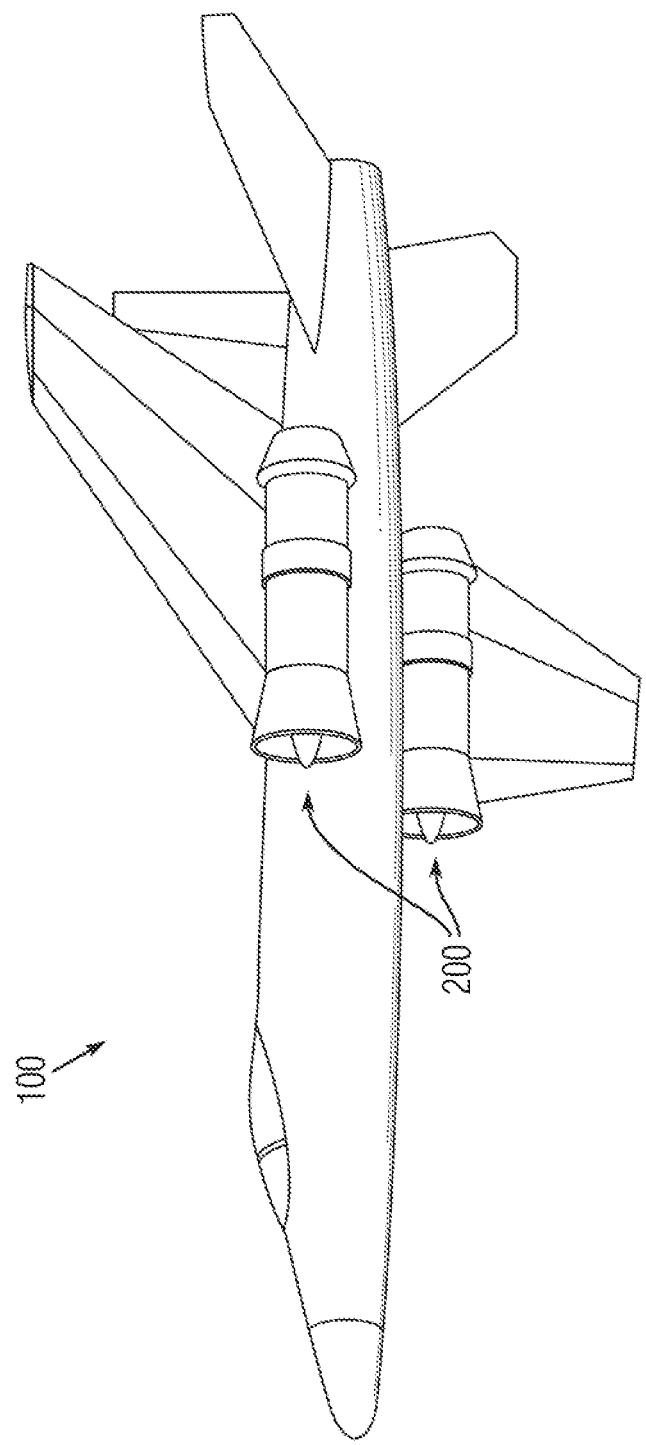
FIG. 1 is a schematic view of a conventional aircraft.
Figure 2:
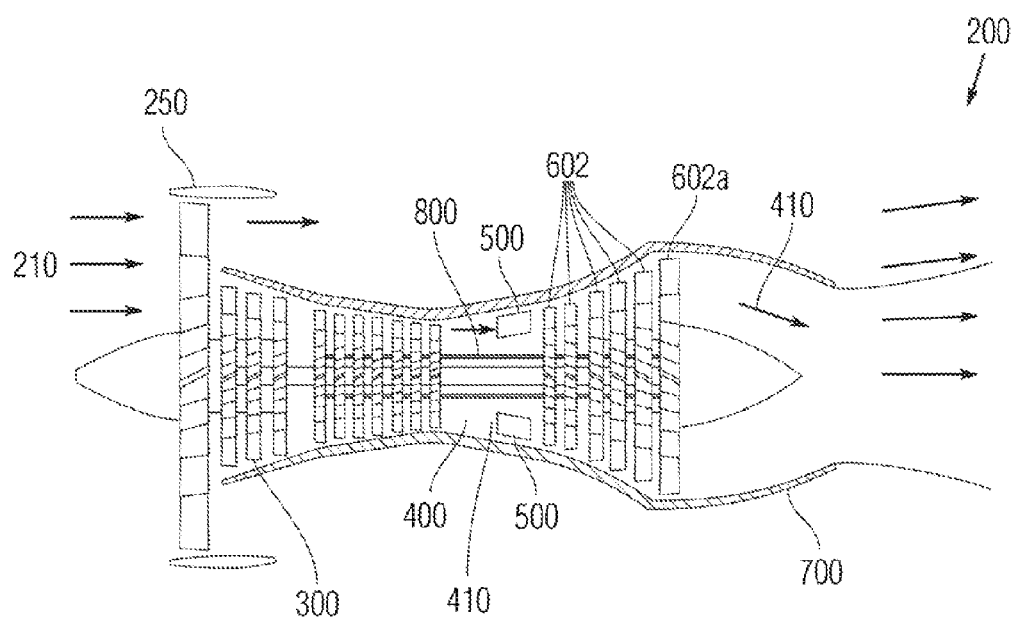
FIG. 2 illustrates various components of the conventional turbine engine.

In accordance with a broad aspect of the present invention, to substantially increase the thrust output of the engine (particularly a jet engine), liquid from a liquid source is directed into a liquid inlet 604 and is then routed to the turbine blades or the rotating shaft of the turbine. As illustrated in FIG. 2, the air 210 is drawn into the turbojet by the by-pass fan 250 and the compressor 300. FIG. 2 is one embodiment showing a by-pass type arrangement where air flows around the inlet to the compressor 300, it will be understood that other designs are possible where more air flow is directed into the compressor 300. The compressor 300 slows down the incoming air, raising its pressure, and delivers the fluid (air) to the combustion chamber 400. Fuel is injected into the high-pressure air in the combustion chamber and ignited by the fuel burner 500. The resulting hot gases 410 expand and rush first through the turbine 600 and then through the nozzle or exhaust section 700 at the rear. The rotating shaft 800 can connect all the above components to provide momentum when rotating. A forward thrust is generated as a reaction to the rearward momentum of the exhaust gases.

Figure 3:
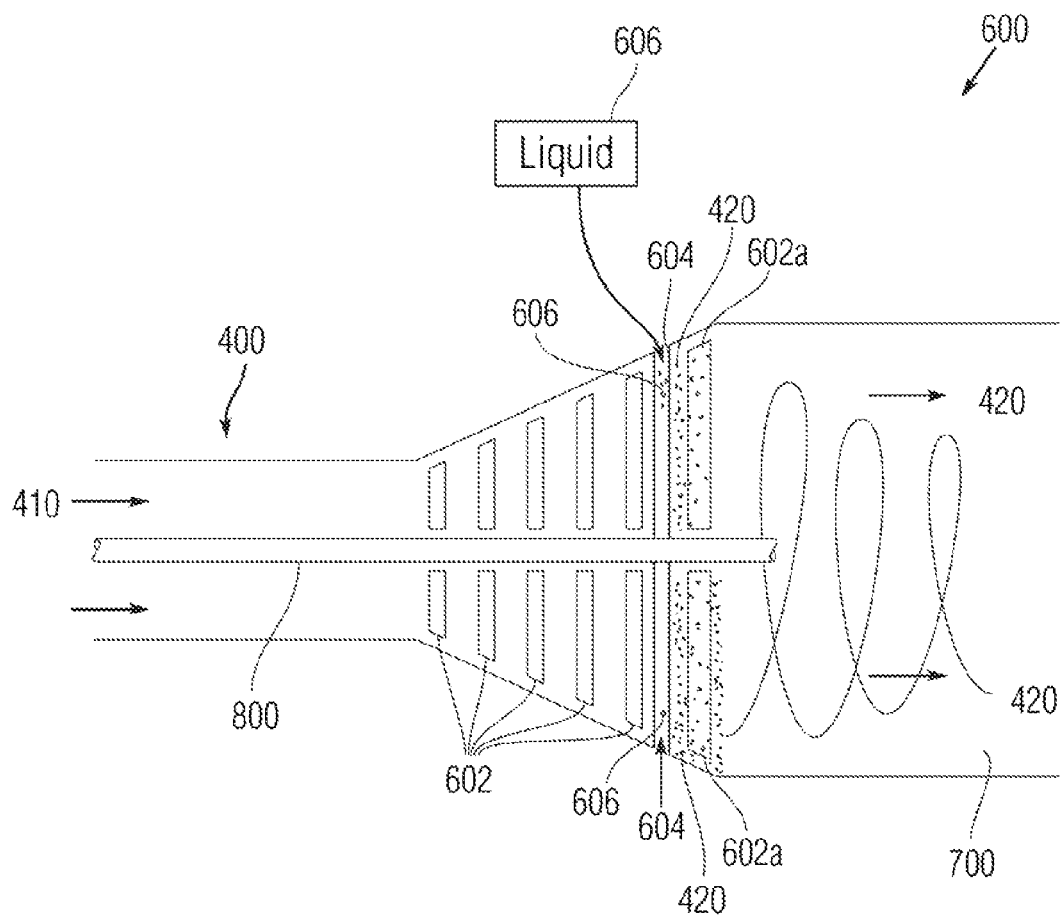
FIG. 3 is a schematic showing flow of liquid through liquid inlet on the turbine blades in accordance with the present invention.

FIGS. 2-3 illustrates a schematic showing the turbine 600, wherein the hot gasses 410 rotate the rotating shaft 800 in the combustion chamber 400. In accordance with the present invention, when the hot gasses 410 reach the turbine blades (602, 602a), liquid 606 is dispersed through a liquid inlet 604 that is located between the turbine blades (602, 602a). The turbine 600 as shown in FIG. 3, illustrates flow of the liquid 606 from a source through a liquid inlet 604 between the turbine blades 602a. The liquid 606 from the liquid inlet 604 flows from the inlet 604 towards the last blade 602a of the turbine blades 602 as a result on positive pressure (e.g., a pumping action) being applied to the liquid that is sufficient to overcome the force of the high pressure gases 410 flowing from the combustion chamber 400 towards the turbine blades 602.

In contrast to conventional blade evaporative cooling designs where air is introduced and placed in contact with turbine blades for the cooling thereof (as described above), the present invention is directed to a different, more efficient use of a liquid, such as water being introduced into contact with the turbine blades. More specifically, the turbine blade design is configured to permit flow of liquid relative to the blades for the purpose of generating and introducing small water droplets downstream of the turbine blades which in turn will generate a gas, such as steam that flows in a prescribed pattern as described below.

Due to the high pressure and gasses 410 flowing from the combustion chamber 400 towards the turbine blades (602, 602a), the liquid that is introduced into contact with the turbine is converted into small liquid (water) droplets that are discharged from the turbine blade in this form by incorporating openings or nozzles as part of the turbine blade structure. For example, a downstream or trailing edge can be configured to discharge small liquid droplets into the hot combustion gases that surround and are located downstream of the turbine blades. For purposes of the present application, the term "droplet" is to be broadly construed as a small quantity, especially of a liquid that is heavy enough to fall in a spherical mass. Liquids, such as water or oil, can form droplets that are held together by surface tension—a cohesive force that causes the surface of many liquids to behave as an elastic membrane. A droplet on a surface, for example, spreads out or balls up depending on its interaction with the surface. As a freely suspended droplet rotates at higher and higher velocity, the droplet will tend to get pulled apart and deform. Droplets distort according to a minimum energy principle, always seeking the lowest energy state for a given rotational frequency. Therefore, a droplet is not limited to any particular shape since in accordance with the present invention, the rotational forces imparted to the droplet cause a distortion of the shape of the droplet as described above. The size of the droplet can vary depending upon the location of where the droplet is discharged with respect to and in relation to the rotor assembly. For example, the liquid droplet can have a size of approximately 10 microns when it is discharged at or near the more forward rotors (closer to the combustion chamber) of the rotor assembly, while when the droplet is discharged at the more rearward rotors or at the end of the shaft (as described herein), the liquid droplet can have a size greater than 10 microns and/or can be a fine stream of liquid.

While water can be used as the liquid that is delivered to the blades, it will be appreciated that the liquid flowing from the inlet 604 can assume any number of other forms, including but not limited to water, water-methanol mixture, methanol, fuel, lubricant or other vaporizing liquid or a combination of the preceding. The liquid flowing from the inlet 604 can also include a combination of liquid and air.

In an embodiment of the present invention, the last turbine blades 602a are blades that are configured to allow for fluid flow therein for generating the fine liquid droplets discussed above. In particular, the blades 602a can be hollow and perforated in select areas, such as along the trailing edge thereof, to receive the fluid in their hollow, central interior. The perforated structure of the blades 602a allow for discharge of the liquid droplets 420 from the blades 602a while at the same time. When the liquid is delivered under pressure (e.g., pumped) to the blades, the liquid is forced through the small openings in the blade wall, thereby generating fine liquid droplets. It will be appreciated that while the blades 602a preferably include perforations along or near the turbine's trailing edge, the perforations can be formed also in other locations that permit the desired droplet formation as described herein.

In one embodiment of the invention, the liquid inlet 604 can include a plurality of holes to allow the liquid to be discharged from the blades 602a in the form of fine liquid droplets. The location and size of the holes are selected in order to produce liquid droplets that have the desired characteristics (e.g., size of droplets, quantity or flow rate of discharged liquid through the holes, etc.)

In accordance with one embodiment, the liquid droplets are discharged in a manner such that they assume certain flow characteristics that are advantageous to the practice of the present invention. As is readily accepted, the shortest distance between two points is a straight line, while in a more elaborate flow pattern, such as a swirl, a much greater distance is actually traveled in covering the same linear distance. For example, a particle traveling linearly between two points may only cover a distance of one (1) meter, while a particle that flows in a non-linear swirling action or curved flow path will actually travel a much greater distance, such as 5-10 meters depending on the flow characteristics, as the particle travels the linear distance of 1 meter.

The liquid droplets 420 thus stream in motion, evaporating and/or combusting with non-linear swirling or curved flow path. In contrast to conventional designs, the injected liquid is discharged from the blade's sides and/or trailing edge as fine liquid droplets as opposed to being in the form of a gas. As mentioned above, the liquid droplets are discharged into the post-turbine space such that they assume a flow pattern (swirling action) within the space. As the liquid droplets are discharged into and travel in the flow pattern in this space downstream of the turbine, the liquid droplets encounter hot combustion gases and/or compressed air from a by-pass fan or other source which results in the liquid droplets being converted to stream.

The conversion of the liquid droplets to steam increases the volume, which results in the gas leaving the nozzle or exhaust section 700 with increased thrust. The hot gases that are flowing through the turbine engine undergo a change in temperature and volume as they flow downstream through the engine. As mentioned above, the hot gases flowing through the engine exhibit an increase in volume as a result of the introduction of the liquid droplets and subsequent creation of steam.

In accordance with one embodiment of the invention, the liquid inlet 604 from where the liquid 606 is dispersed can be disposed anywhere around the turbine blades 602 or even after the last blade 602a or can be incorporated into the turbine blade 602 itself as discussed herein. As the liquid 606 converts to liquid droplets 420 and evaporates in the turbine 600 into steam that travels in a non-linear pattern (swirl), an increased thrust is achieved due to rapid expansion of the gasses in the turbine engine 200.

In another embodiment of the invention, the nozzle 700 where the thrust leaves the turbine engine 200 can be connected to another device to produce even more efficient usage of the exhausted energy (not shown) (e.g., a power extraction turbine).

In yet another embodiment, a deflector can be provided downstream of where the droplets are discharged so as to alter the flow of the droplets and change the characteristics. For example, a stationary member (e.g., a deflector) is provided downstream of the swirling discharged droplets and the droplets contact the stationary surface (deflector) so as to cause a splattering effect of the droplets. For example if the droplets splatters, the speed of the evaporation is increased since the splattering results in more droplets, of smaller size, being formed and more liquid surface area is created for contact with the hot gases.

Example

In a conventional gas turbine engine setup, as described herein, there is a combustion element or chamber where air is combined with a fuel (such as natural gas or jet liquid fuel or kerosene, etc.). In this conventional arrangement, temperatures in the combustion chamber are on the order of 1600-2100° F. (combustion gas with thrust energy). In accordance with the present invention, the gas turbine is modified by inclusion of a water thrust boost as described herein. The result is that the combustion chamber upstream of the location where the liquid droplets are discharged into the combustion gases operates at a conventional temperature on the order of 1600-2100° F., while downstream of the location of where the liquid droplets are introduced operates at a temperature of about 300° F. In addition, this downstream space includes not only the combustion gas but also includes steam (from heating of the liquid droplets) and results in more thrust energy being obtained.

The entropy of vaporation is the increase in entropy when vaporizing a substance. For water the entropy of vaporation is about 900 BTU/lb (water at 70° F. to steam at 700° F.). A heating value of natural gas is approximately 1093 BTU/ft$^3$. In order to calculate an exemplary consumption in the embodiment described herein according to the present invention assumes that approximately 30% of the exhaust gas exits the turbine at approximately 800° F. is cooled to about 200° F. by water evaporation as described herein. This results in a consumption of about 0.26 lb of water per cubic feet of natural gas and accordingly, the water consumption of water per pound of natural gas is about 4.6 lbs.

Alternatively, instead of natural gas being the fuel source, the fuel source can be in the form of #2 fuel oil/jet petroleum. This fuels source has a heat value of about 42,000 BTU/gal. The water consumption of water per pound of oil is about 6.5 lbs of water per lb of oil.

Conventionally, 20% of the fuel energy is leaving the nozzle (of the turbine based engine) and/or is contacting a combined cycle boiler at a temperature of about 800° F. A conventional combined cycle boiler recovers 5 to 10% yielding a total efficiency of between about 55 to 64%. In accordance with the present invention, an arrangement and system are described that equal or exceed the efficiency of the above described conventional system while eliminating the need for a boiler. The present invention can include a power extraction device downstream of the disclosed turbine arrangement that includes the improvements described herein. In other words, the introduction of liquid droplets as described herein in a swirling manner to the hot combustion gases improves the overall efficiency of the system and results in improved total efficiency compared to the conventional efficiencies.

The present invention is capable of achieving these efficiencies with lower capital cost and/or allowing aircraft/transportation use. In general, the energy enhancement realized by the present invention is equal to the entropy of HOH (gas) steam at 800° F.—the entropy HOH (liquid) water at 70° F. multiplied by a factor (F) which is at least about 20%.

Figure 4:
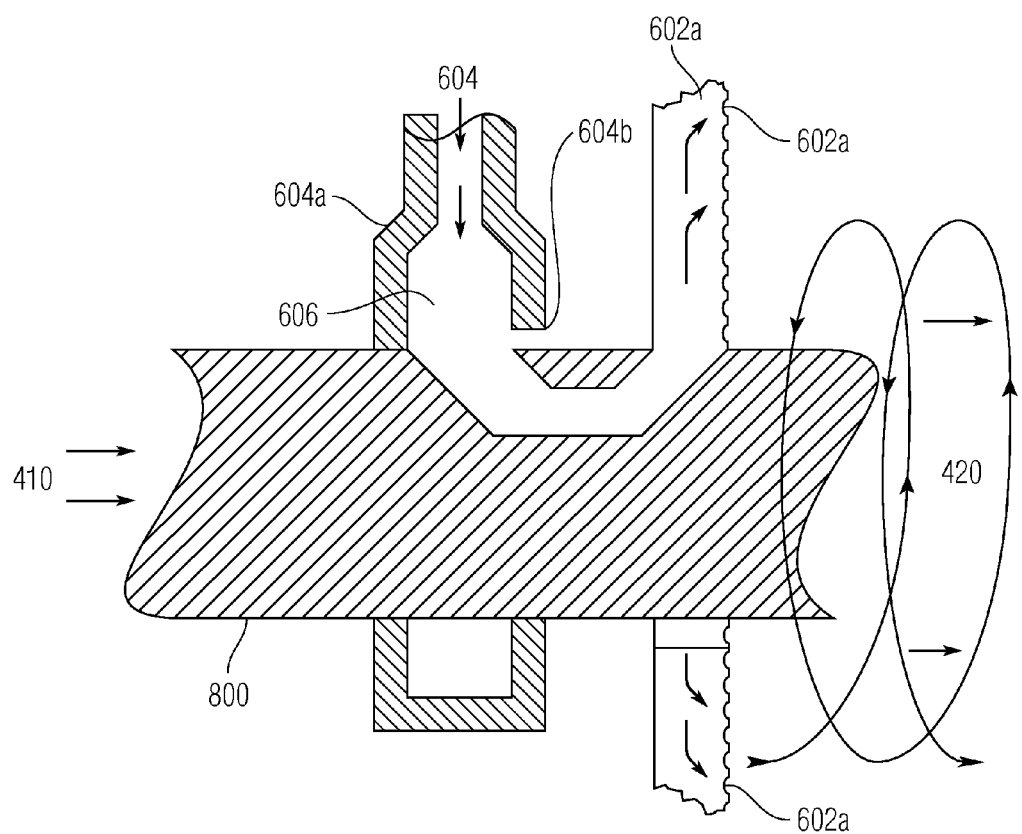
FIG. 4 is a schematic view of a sealed chamber having an opening to disperse the liquid on the turbine blades in accordance with the present invention.

In one embodiment of the present invention, as illustrated in FIG. 4, the liquid 606 flows from the liquid inlet 604 towards rotating shaft 800 and then through blades 602a. The liquid 606 is delivered into a sealed chamber 604a having a seal opening 604b. The inlet 604 is thus sealingly coupled to the shaft 800. The sealed chamber 604a facilitates liquid flow and surrounds the rotating shaft to provide maximum cooling effect to the rotating shaft 800 and the atmosphere in the turbine 600. As the liquid 606 flows out from the open section of the seal opening 604b towards the blades 602a, the liquid turns into liquid droplets 420. This transformation from liquid 606 to liquid droplets 420 is due to temperature and pressure variation. The sealed chamber 604a can be a mechanically attached washer shaped piece that allows liquid (water) to flow through and rotates at the same speed as the rotating shaft 800. In other words, a circumferential opening (e.g., 360 degree opening) is provided to allow flow of water in a 360 degree manner. Alternatively, the shaft 800 can include a flow channel that is in fluid communication with the hollow interior of the sealed chamber 604 to route the liquid through the chamber 604 into the hollow interior of the blade 602a and then to the holes formed therein for creation of the liquids droplets as described herein.

Figure 5:
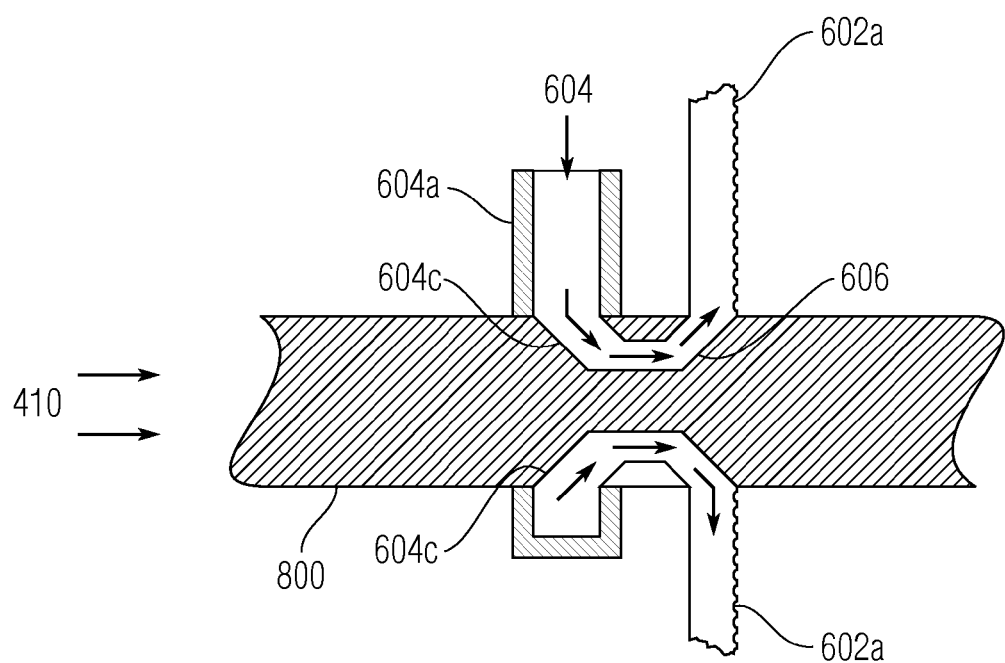
FIG. 5 is a schematic showing flow of liquid through the rotating shaft and then into the blades in accordance with the present invention.

In another embodiment of the present invention, as shown in FIG. 5, the liquid 606 from the liquid inlet 604 can flow through a channel 604c in the rotating shaft 800 and then into the hollow portions of the blades 602a. The liquid 606 is received into the sealed chamber 604a having a channel 604c that is in fluid communication with the blades 602a. The liquid 606 flows within the hollow interior of the blades 602a and is discharged through the openings (holes) formed therein to create the desired liquid droplets or fine stream of liquid being emitted from the blades in a swirling manner into the hot combustion gases. This transformation from liquid to liquid droplets downstream of the blades 602a produces an increased thrust output.

Figure 6:
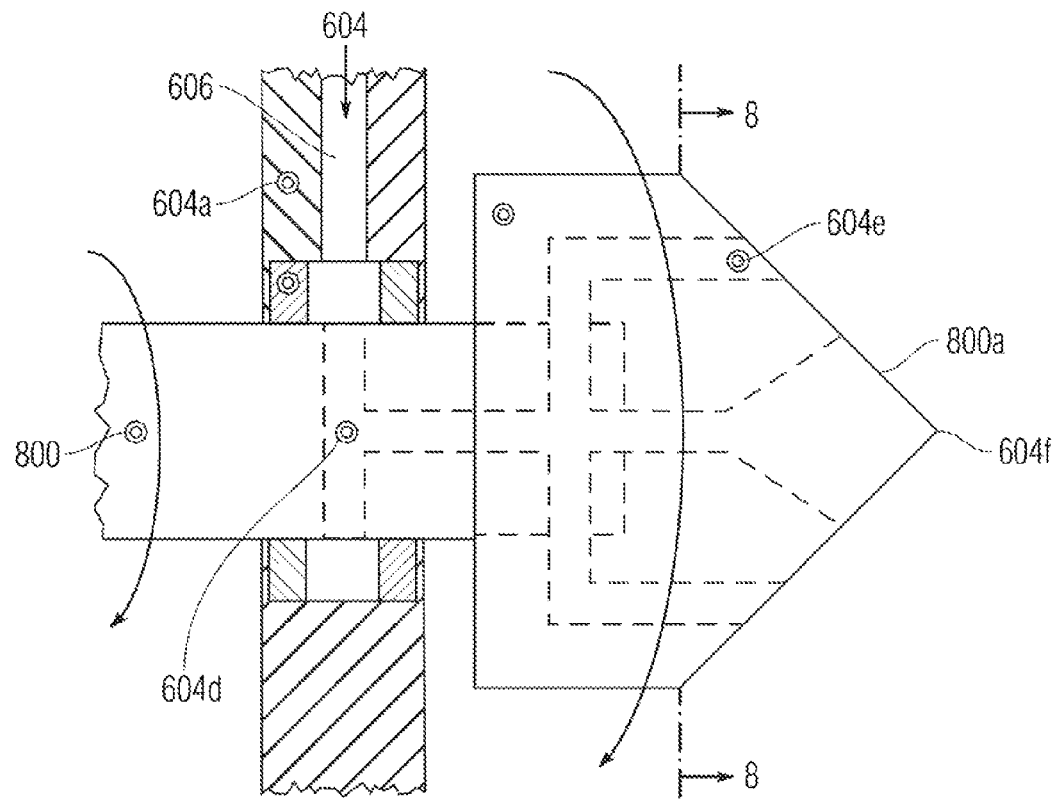
FIG. 6 is a schematic showing flow of liquid through the rotating shaft towards an end of the rotating shaft through various holes in accordance with the present invention.
Figure 7:
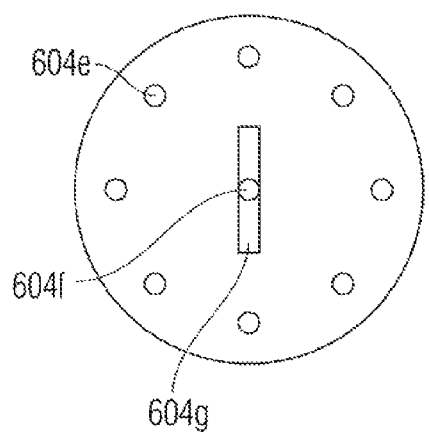
FIG. 7 is a cross-sectional view illustrating various holes at the end of the second rotating shaft in accordance with the present invention.

In a particular embodiment of the invention, as shown in FIGS. 6-7, the liquid is delivered to the liquid inlet 604 can flow through the rotating shaft 800 towards the rotating end of the shaft 800a through various holes 604e, 604f, and 604g. The liquid 606 is dispersed into the sealed chamber 604a that flows towards the rotating end of the shaft 800a through the interconnected liquid flow channel 604d. The liquid enters through inlet 604 and flows into the channel 604d formed in the shaft 800 and then flows towards the rotating end of the shaft 800 and escapes from the holes 604e, 604f, and 604g forming liquid droplets 420 that quickly goes to a gas (steam) due to the presence of high temperature. The holes 604e, 604f, 604g represent a plurality of channels formed in the distal end of the shaft 800 and are in fluid communication with the main channel 604d.

The liquid thus flows through shaft 800 and towards the distal end of the shaft 800, escaping from the holes, thereby enhancing the cooling effect and increases thrust output of the turbine by regulating operating temperature and thereby the efficiency of the turbine engine. A section of FIG. 4 shows the hole where water flows into hot gases is illustrated. FIG. 7 shows various channels/holes (604e, 604f, 604g) in the rotating shaft end 800a from which liquid 606 can escape forming liquid droplets 420.

Figure 8:
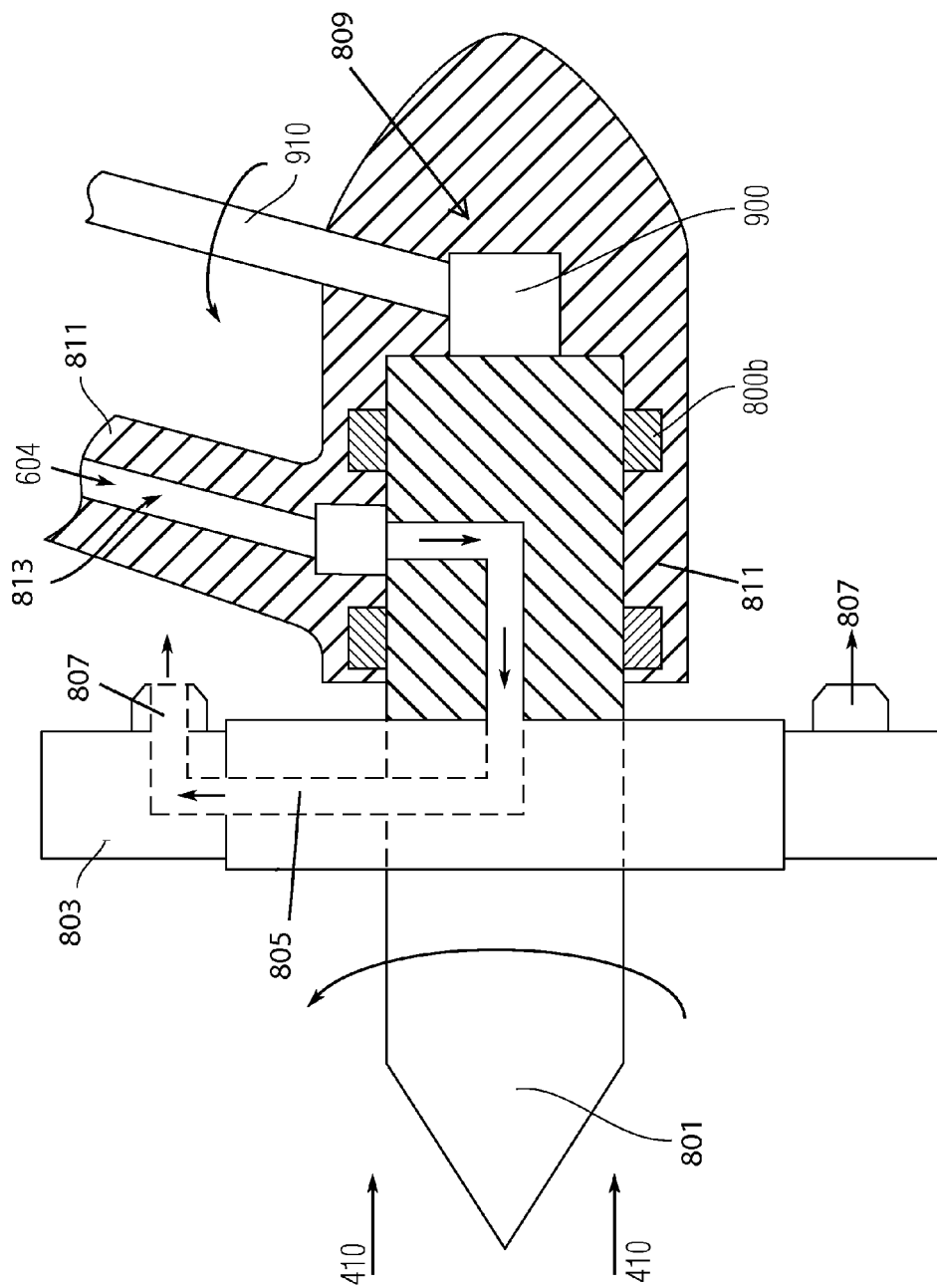
FIG. 8 is a schematic showing flow of liquid through a second rotating shaft rotated by means other than thrust gas flow and then into the blades in accordance with the present invention after the turbine acting on hot thrust gases.

In accordance with another embodiment of the invention illustrated in FIG. 8, a shaft 801, which rotates is shown, and is separate and spaced from the shaft that connects the compressor to the turbine. In accordance with the present invention, the shaft 801 is constructed to permit liquid to flow therethrough. More specifically, the shaft 801 has a rotating piece 803 which can be in the form of a blade structure or nozzle or other protrusion that rotates with the shaft 801. The rotating piece 803 includes an internal conduit 805 through which the fluid flows and includes a plurality of openings 807 to allow dispensing of fluid from the rotating piece 803. Some of the openings 807 are located along the trailing edge of the blade structure as shown. Fluid flow is shown by the arrows in FIG. 8. Since rotation of the shaft 801 is independent from rotation of the shaft that connects the compressor to the turbine, the rotation speed of the shaft 801 can be greater or less than the rotation of the turbine shaft and also, the direction of rotation of the shaft can be opposite to the rotation of the turbine shaft. The assembly of FIG. 8 includes a drive mechanism 809 that is configured to drive (rotate) the shaft 801 and rotating piece 803 independent (in speed and direction) from rotation of the turbine shaft as discussed above. The drive mechanism 809 can be a mechanical drive that is configured to rotate the shaft 801 at a selected speed and direction. FIG. 8 shows one type of mechanical drive in the form of a structure 811 that is attached (clamped) to the shaft 801 by a seal bearing unit 800b to permit rotation of the shaft 801 relative to the structure 811. The mechanical drive 809 can include a gear or motor 900 which is operatively connected to the shaft 801 for driving (rotating) the shaft 801. Other structures can be used to drive the shaft 801 including but not limited to a mechanical arm. FIG. 8 shows a rotating shaft 910 that is attached to the gear 900, which in turn drives the shaft 800. Inlet 604 allows delivery of fluid (e.g., water) into a channel section 813 formed in the structure 811 and then into the channel section formed in shaft 801 before flowing into the channel section formed in the rotating piece 803. Alternatively, the shaft 801 can be driven (rotated) by fluid flow (gas flow) either in combination with or as an alternative to the use of a mechanical drive coupled to the second shaft 801. The rotating piece 803 can thus be in the form of a nozzle piece that extends radially from the shaft 801 and can be configured to rotate due to gas flow (gas contacting the nozzle piece). The flow of high pressure gases is indicated by arrows 410. The rotating piece can thus be thought of as being a free wheeling blade structure that rotates due to impinging gas flow.

Figure 9:
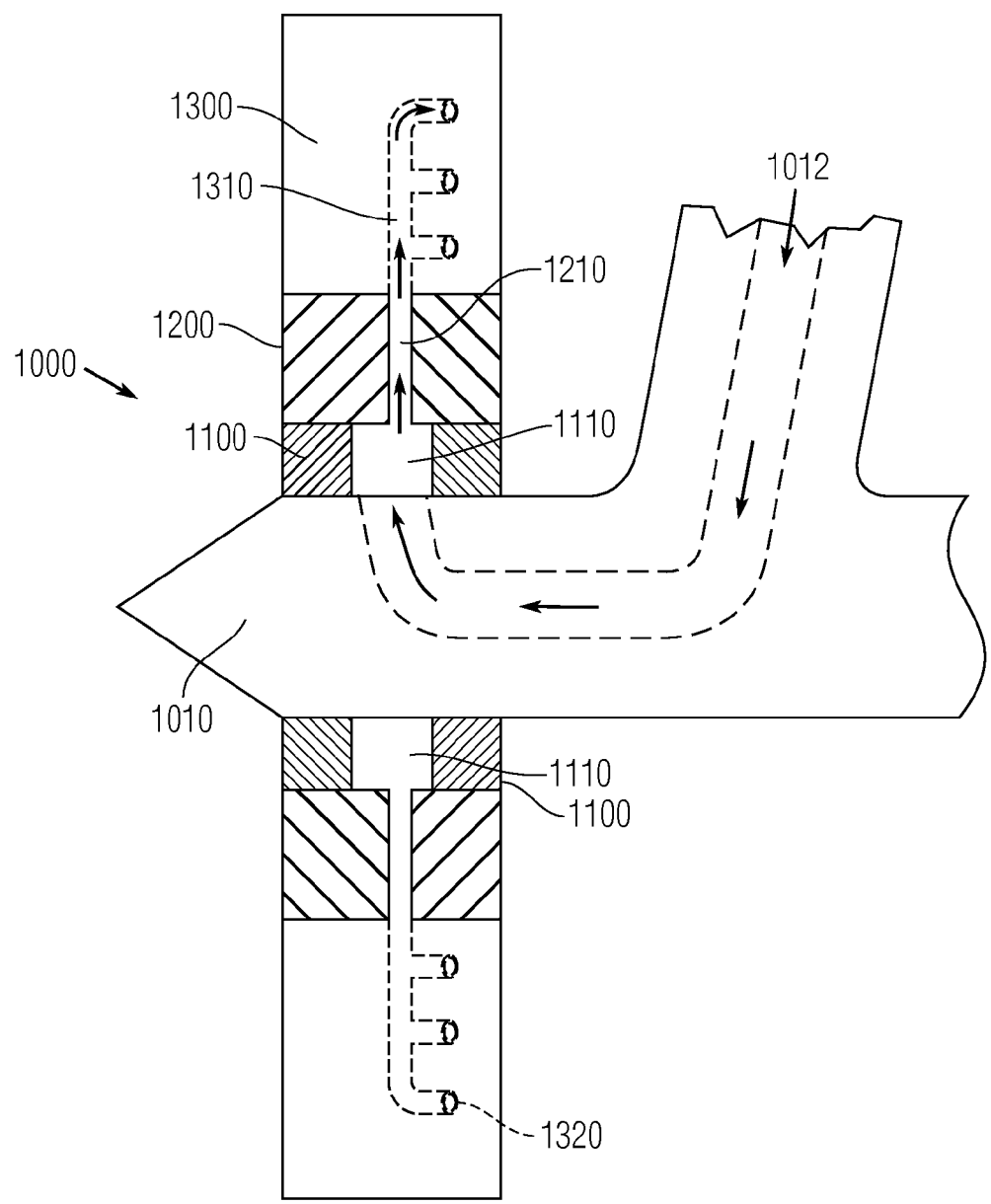
FIG. 9 is a sectional view of a gas turbine engine according to another embodiment including flow of hot combustion gases acting on blades or other shaped members causing rotation.

Referring now to FIG. 9, a gas turbine device or arrangement 1000 is shown. The device 1000 shares similarities with previous embodiments described hereinbefore as will be appreciated by the drawing figures (especially FIG. 8). This embodiment is rotated by fluid flow over it causing a rotation that is similar to that of a windmill. The device 1000 includes a shaft 1010 that is structurally secured to the gas turbine casing and is stationary relative to the casing. The device 1000 is configured so that it facilitates fluid flow (e.g., water flow) through components of the device, such as the turbine blade, and is introduced into the combustion gas in quantity and droplet size and location and velocity to most advantageously increase thrust and/or power extraction through a power turbine, etc. The shaft 1010 includes a channel 1012 through which the fluid can travel. It will be appreciated that the channel 1012 communicates at one end with a liquid source. The liquid source can be water or it can be a mixture of water and methanol or it can be methanol, or fuel and liquid with lubricant or a volatile liquid and/or in part additive.

A bearing/seal assembly 1100 is provided and intimately in contact with the shaft 1010 to permit the liquid to flow through the channel 1012 and then exit the shaft 1010 by flowing into a channel or space 1110 formed in the bearing 1100. A bushing 1200 is provided in fluid communication and intimate contact with the bearing 1100 to further provide a flow path for the liquid as it flows through and exits the shaft 1010. The bushing 1200 includes a channel or space 1210 that is in fluid communication with the space 1110 and permits the liquid to flow radially outward from the shaft.

The bushing 1200 is sealingly coupled to an outer perimeter of the bearing 1100 and is also sealingly coupled to the turbine blade 1300. The turbine blade 1300 includes a channel 1310 that is axially aligned and in fluid communication with the channel 1210 to allow the liquid to flow through the bushing 1200 and into the interior of the blade 1300. The channel 1310 is a main flow channel to route the liquid through the blade 1300 and is in fluid communication with a plurality of openings or outlet ports 1320 that are formed in the blade 1300 and are open to the exterior. The outlet ports 1320 thus represent discharge outlets, such as nozzle outlets, through which the liquid flowing in the channel 1310 flows. As mentioned herein, the openings 1320 are spaced apart from one another and formed along the blade, such as along a trailing edge thereof, to facilitate the generation of liquid droplets that are delivered into the hot combustion gases to produce steam. As mentioned herein, the operation of the turbine blade and the formation of the openings causes the liquid droplets to assume a non-linear path of travel (e.g., a swirl) after passing through the turbine blade and being introduced to the hot combustion gases. The resulting generation of steam provides the advantages described herein.

It will also be appreciated that in accordance with the present invention, the discharged droplets are not limited to being water droplets but instead, the droplets can be in the form of fuel that is added either post turbine or post shaft in the same manner described hereinbefore resulting in the fuel being discharged as droplets which can burn.

In yet another embodiment, the present invention teaches a gas turbine engine that includes a combustion chamber and a nozzle. The turbine engine includes a source of fuel; a turbine blade assembly that is rotatable about a central shaft; and a means for adding fuel downstream of the combustion chamber, the fuel being added such that it assumes swirled, curved, non-linear flow paths. The discharged fuel can be at least one of fuel droplets, a coal based fuel and a heavy fuel oil.

The present invention thus provides a method and apparatus for increasing thrust or other useful energy output of a device with a rotating element (e.g., turbines of a gas turbine engine). The increased thrust is realized due to liquid injected into the turbine system vaporizing quickly in small volume (due to the liquid that is ejected from the rotating turbine blades assuming a swirling pattern) with increased through gas volume yielding benefit.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A turbine arrangement for use in a gas turbine engine that includes a combustion chamber comprising:
   a source of liquid; and
   a turbine blade assembly that is rotatable about a central shaft, the blade assembly including a plurality of turbine blades, each blade having a forward edge that faces the combustion chamber and an opposite rear edge, wherein a hollow interior of at least one blade has a fluid conduit formed therein that is in fluid communication with the source of liquid to permit the liquid to flow along the fluid conduit within the blade, the blade including a plurality of openings in direct communication with the fluid conduit formed in the blade, the plurality of openings being open along an exterior surface of the blade and sized to produce liquid droplets as a result of the liquid being forced through the openings under pressure to create the liquid droplets for discharge downstream of the turbine blade to generate a gas due to contact with hot gases generated by the combustion chamber;
   wherein the rotation of the turbine blades and discharge of the liquid in droplet form from the rotating blades causes the liquid droplets to travel in a non-linear pattern resulting in conversion of the liquid droplets to a gas and an increase in volume for the hot gases, thereby resulting in the hot gases leaving an exhaust section with increased thrust.

2. The turbine arrangement of claim 1, wherein a size of the liquid droplet is approximately 10 microns.

3. The turbine arrangement of claim 1, wherein the liquid is selected from the group consisting of water, water-methanol mixture, hydrocarbon fuel, methanol and mixtures thereof.

4. The turbine arrangement of claim 1, wherein the gas turbine engine is part of a jet engine assembly.

5. The turbine arrangement of claim 1, wherein the liquid is delivered under pressure to the turbine blade.

6. The turbine arrangement of claim 1, wherein the exhaust section comprises a nozzle is operatively connected to an energy extraction or turbine device to produce increased efficient usage of the hot gases exhausted by the nozzle.

7. The turbine arrangement of claim 1, including a liquid inlet that is in fluid communication with the source of liquid, the liquid inlet being in fluid communication with a channel formed in the shaft that is also in fluid communication with the interior of the blade such that the liquid flows through the inlet, the channel in the shaft and into the blade before being discharged therefrom.

8. The turbine arrangement of claim 7, wherein the liquid inlet is sealingly coupled to the shaft.

9. A turbine arrangement for use in a gas turbine engine that includes a combustion chamber comprising:
a source of liquid;
a turbine blade assembly that is rotatable about a central shaft, the blade assembly including a plurality of turbine blades, each blade having a forward edge that faces the combustion chamber and an opposite rear edge, wherein a hollow interior of at least one blade is in fluid communication with the source of liquid, the blade including a plurality of openings in communication with the hollow interior and sized to produce liquid droplets for discharge downstream of the turbine blade to generate a gas due to contact with hot gases generated by the combustion chamber; and
an impinging surface that is located downstream of where the liquid droplets are discharged to provide a surface that acts on the swirling droplets to cause the droplets to evaporate quicker;
wherein the rotation of the turbine blades and discharge of the liquid in droplet form from the rotating blades causes the liquid droplets to travel in a non-linear pattern resulting in conversion of the liquid droplets to a gas and an increase in volume for the hot gases, thereby resulting in the hot gases leaving an exhaust section with increased thrust.

10. The turbine arrangement of claim 9, wherein the impinging surface is stationary relative to the rotating components of the turbine.

11. A turbine arrangement for use in a gas turbine engine that includes a combustion chamber comprising:
a source of liquid;
a rotatable shaft that is coupled to a turbine housing, the shaft being stationary relative to the housing, the shaft including a liquid inlet member that is in fluid communication with the source of liquid and a channel for routing the liquid within and along a length of the shaft;
a bearing/seal assembly including a bearing that is in intimate contact with the shaft and includes an opening that is aligned with the shaft channel so that the liquid can flow therein from the shaft, the assembly further including a bushing that is in intimate contact with the bearing and includes an opening that is aligned with the opening of the bearing to allow the liquid to flow therein in a direction radially outward from the shaft;
at least one rotatable member that is sealingly coupled to the bushing and includes a channel formed internally therein, the channel being fluidly connected to the opening in the bushing to allow the liquid flowing within the bushing to flow into the channel, the channel being in fluid communication with a plurality of outlet ports formed within the rotatable member, the outlet ports being sized to produce liquid droplets for discharge downstream of the rotatable member to generate gas due to contact with hot gases generated by the combustion chamber;
wherein the rotation of the rotatable member and discharge of the liquid in droplet form causes the liquid droplets to travel in a non-linear, swirling pattern resulting in conversion of the liquid droplets to gas and an increase in volume for the hot gases, thereby resulting in the hot gases flowing downstream of the rotatable member with increased thrust.

12. The turbine arrangement of claim 11, wherein the discharge openings are formed to create approximately 10 micron sized liquid droplets.

13. The turbine arrangement of claim 11, wherein the discharge openings are formed along the trailing edge of the rotatable member.

14. The turbine arrangement of claim 11, further including: means for introducing air to support combustion, the air being delivered into the turbine arrangement to improve combustion by by-pass or other means.

15. The turbine arrangement of claim 11, wherein the liquid is selected from the group consisting of a heavy oil, a slurry of coal dust, water, methanol and a hydrocarbon in whole or part.

16. The turbine arrangement of claim 11, wherein the engine is of a by-pass air type where air flows around and beyond the turbine.

17. The turbine arrangement of claim 11, wherein the at least one rotatable member comprises a free wheeling structure that rotates due to impinging gas flow.

18. A turbine arrangement for use in a gas turbine engine that includes a combustion chamber and a nozzle comprising:
a source of liquid;
a liquid inlet member that is in fluid communication with the source of liquid; and
a turbine blade assembly that is rotatable about a central shaft, wherein the liquid inlet member is sealingly coupled to the shaft, the blade assembly including a plurality of turbine blades, the blade having a forward edge that faces the combustion chamber and an opposite rear edge, wherein the central shaft includes at least one main channel that is in fluid communication with the liquid inlet member for receiving liquid therefrom, the central shaft further including a plurality of secondary channels each of which is in communication with the main channel and terminates in an opening formed at a rotating end of the central shaft, the opening being sized to produce liquid droplets for discharge downstream of the turbine blade to generate a gas due to contact with hot gases generated by the combustion chamber;
wherein the rotation of the central shaft and discharge of the liquid in droplet form causes the liquid droplets to travel in a non-linear pattern resulting in conversion of the liquid droplets to gas and an increase in volume for the hot gases, thereby resulting in the hot gases leaving the nozzle with increased thrust.

19. A turbine arrangement for use in a gas turbine engine that includes a combustion chamber comprising:
a source of liquid;
a main turbine blade assembly that includes a first rotating shaft and a turbine blade section coupled to and rotating with the first rotating shaft;

a second shaft assembly downstream of the main turbine blade assembly, the second shaft assembly including a second rotating shaft that is independent and spaced from the first rotating shaft, the second shaft assembly including a protrusion that extends radially outward from the second rotating shaft and rotates therewith, the protrusion having a forward edge that faces the combustion chamber and an opposite rear edge, wherein a hollow interior of the protrusion is in fluid communication with the source of liquid, the protrusion including a plurality of openings that are open along an exterior surface thereof and are in fluid communication with the hollow interior and sized to produce liquid droplets for discharge downstream of the protrusion to generate a gas due to contact with hot gases generated by the combustion chamber;

a mechanical drive unit operatively coupled to the second rotating shaft for rotating the second rotating shaft;

a liquid inlet that is in fluid communication with the source of liquid, the liquid inlet being in fluid communication with a channel formed in the second rotating shaft, the channel being in fluid communication with the interior of the protrusion such that the liquid flows through the inlet, through the channel in the second rotating shaft and into the hollow interior of the protrusion before being discharged through the openings formed in the protrusion;

wherein rotation of the second rotating shaft and discharge of the liquid in droplet form from the protrusion, which rotates with the second rotating shaft, causes the liquid droplets to travel in a non-linear pattern resulting in conversion of the liquid droplets to a gas and an increase in volume for the hot gases, thereby resulting in the hot gases leaving an exhaust section with increased thrust.

20. The turbine arrangement of claim 19, wherein a housing of the mechanical drive unit is sealingly coupled to the second rotating shaft by means of a seal bearing unit.

21. The turbine arrangement of claim 19, wherein the liquid inlet includes a channel section formed in the mechanical drive unit, the channel section being in fluid communication with the channel in the second rotating shaft to allow fluid to flow through the mechanical drive unit into the second rotating shaft.

22. The turbine arrangement of claim 19, wherein the mechanical drive unit includes a gear that is operatively connected to the second rotating shaft to translate actuation of the mechanical drive unit into rotation of the second rotating shaft.

23. The turbine arrangement of claim 19, wherein the second rotating shaft is configured to be driven at least one of a different speed and a different direction relative to the first rotating shaft.

24. The turbine arrangement of claim 19, wherein the mechanical drive unit includes a motor for rotating the second rotating shaft.

25. The turbine arrangement of claim 19, wherein the protrusion comprises one of: (1) a plurality of blades that extend radially outward from the second rotating shaft, at least one blade having an internal channel that receives the liquid from the second rotating shaft, the at least one blade having a plurality of openings that are open along an exterior surface thereof and are in communication with the internal channel to allow discharge of the liquid; and (2) a nozzle having an opening for discharging the liquid.

26. A turbine arrangement for use in a gas turbine engine that includes a combustion chamber comprising:

a source of liquid;

a main turbine blade assembly that includes a first rotating shaft and a turbine blade section coupled to and rotating with the first rotating shaft;

a second shaft assembly downstream of the main turbine blade assembly, the second shaft assembly including a second rotating shaft that is independent and spaced from the first rotating shaft, the second shaft assembly including a protrusion that extends radially outward from the second rotating shaft and rotates therewith, the protrusion having a hollow interior that is in fluid communication with the source of liquid, the protrusion having a plurality of openings formed therein that are open along an exterior surface thereof and are in fluid communication with the hollow interior and sized to produce liquid droplets for discharge downstream of the protrusion to generate a gas due to contact with hot gases generated by the combustion chamber;

a housing at least partially surrounding the second rotating shaft, the housing being sealingly coupled to the second rotating shaft by means of a seal bearing unit to permit the second rotating shaft to rotate relative to the housing;

a liquid inlet formed in the housing and in fluid communication with the source of liquid, the liquid inlet being in fluid communication with a channel formed in the second rotating shaft, the channel in the second rotating shaft being in fluid communication with the hollow interior of the protrusion such that the liquid flows through the inlet, through the channel in the second rotating shaft and into the hollow interior of the protrusion before being discharged through the openings formed in the protrusion;

wherein rotation of the second rotating shaft and discharge of the liquid in droplet form from the protrusion, which rotates with the second rotating shaft, causes the liquid droplets to travel in a non-linear pattern resulting in conversion of the liquid droplets to a gas and an increase in volume for the hot gases, thereby resulting in the hot gases leaving an exhaust section with increased thrust.

27. The turbine arrangement of claim 26, wherein the protrusion comprises a plurality of blades that extend radially outward from the second rotating shaft, at least one blade having an internal channel that receives the liquid from the second rotating shaft, the at least one blade having a plurality of openings that are open along an exterior surface thereof and are in communication with the internal channel to allow discharge of the liquid, wherein the second shaft assembly including the plurality of blades is a free wheeling structure that rotates due to impinging gas flow.

28. The turbine arrangement of claim 26, wherein the protrusion comprises a nozzle piece that is rotated due to gas flow.

* * * * *